United States Patent
Weindorf et al.

(10) Patent No.: US 9,709,805 B2
(45) Date of Patent: *Jul. 18, 2017

(54) ADJUSTING A HEAD-UP DISPLAY (HUD) BASED ON LIGHT SENSING

(71) Applicant: Visteon Global Technologies, Inc., Van Buren Township, MI (US)

(72) Inventors: Paul Fredrick Luther Weindorf, Novi, MI (US); James Joseph Kornacki, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,036

(22) Filed: Dec. 1, 2014

(65) Prior Publication Data

US 2016/0154238 A1 Jun. 2, 2016

(51) Int. Cl.
*G02B 27/01* (2006.01)
*H05B 37/02* (2006.01)
*B60Q 3/80* (2017.01)
*B60Q 3/18* (2017.01)

(52) U.S. Cl.
CPC .......... *G02B 27/0101* (2013.01); *B60Q 3/18* (2017.02); *B60Q 3/80* (2017.02); *G02B 27/01* (2013.01); *H05B 37/0218* (2013.01); *G02B 2027/0118* (2013.01)

(58) Field of Classification Search
CPC .............. G02B 27/01; B60R 2300/205; G09G 2320/0285; G09G 2320/0626; G09G 2320/066; G09G 2360/144; B60K 2350/203; B60K 2350/2069

USPC ..................................................... 315/77–84
See application file for complete search history.

(56) References Cited

U.S. PATENT DOCUMENTS

| 5,883,605 A | 3/1999 | Knapp |
| 6,388,388 B1 * | 5/2002 | Weindorf ............. G09G 3/3406 315/157 |
| 6,396,217 B1 * | 5/2002 | Weindorf ............. G09G 3/3406 315/169.1 |

(Continued)

FOREIGN PATENT DOCUMENTS

| WO | 2013/167466 A2 | 11/2013 |
| WO | 2013/167466 A3 | 11/2013 |

OTHER PUBLICATIONS

Silverstein et al., "The Development and Evaluation of Color Systems for Airborne Applications-Fundamental Visual, Perceptual, and Display Systems Considerations," SAE International, Oct. 14, 1985, pp. 301-305, Paper Q No. 851774.*

(Continued)

*Primary Examiner* — Thai Pham
*Assistant Examiner* — Borna Alaeddini
(74) *Attorney, Agent, or Firm* — Dickinson Wright PLLC

(57) ABSTRACT

A system for adjusting a heads-up display (HUD) is disclosed herein. The system includes a forward looking light sensor receiver to logarithmically receive a first light information from a forward looking light sensor; and an adjuster to adjust a luminance of the HUD based on the first light information. A method or process may be employed in a similar fashion. The adjuster may be implemented by employing a lookup table, or by employing analog values to perform a transformation relied upon for the adjustment.

7 Claims, 6 Drawing Sheets

(56) References Cited

U.S. PATENT DOCUMENTS

| | | |
|---|---|---|
| 6,479,810 B1 | 11/2002 | Weindorf |
| 6,483,245 B1 | 11/2002 | Weindorf et al. |
| 6,507,286 B2 | 1/2003 | Weindorf et al. |
| 6,690,121 B1* | 2/2004 | Weindorf .......... H05B 41/3927 315/157 |
| 6,762,741 B2 | 7/2004 | Weindorf |
| 8,681,073 B1* | 3/2014 | Robbins ............ H04N 21/4318 345/7 |
| 2002/0101166 A1* | 8/2002 | Weindorf .............. B60Q 3/048 315/82 |
| 2002/0118182 A1* | 8/2002 | Luther Weindorf ..... G09G 3/20 345/204 |
| 2008/0129763 A1* | 6/2008 | Awakura ............. G09G 3/3406 345/690 |
| 2010/0066925 A1* | 3/2010 | Nagahara ............. G02B 27/01 349/11 |
| 2010/0213847 A1* | 8/2010 | Biondo ................. B60Q 1/085 315/82 |
| 2015/0212320 A1* | 7/2015 | Hervy ............... G02B 27/0101 345/7 |

OTHER PUBLICATIONS

"Standard Metrology for Vehicular Displays" SAE International, Jul. 2002, Revised Apr. 2007, pp. 1-27, J1757-1, Available online at www.cie.co.at.

"Road vehicles—Ergonomic aspects of transport information and control systems—Specifications and test procedures for in-vehicle visual presentation" International Standard, Feb. 15, 2009 (second edition), pp. 1-18, ISO 15008 (Ref. No. ISO 15008:2009(E)), Switzerland.

"Ergonomic requirements for work with visual displays based on flat-panels—Part 2: Ergonomics requirements for flat panel displays," International Standard, Dec. 1, 2001(first edition), pp. 1-148. ISO 13406-2 (Ref. No. ISO 13406-2:2001(E)), Switzerland.

Silverstein et al., "The Development and Evaluation of Color Systems for Airborne Applications—Fundamental Visual, Perceptual, and Display Systems Considerations," SAE International, Oct. 14, 1985, pp. 241-365, Paper No. 851774.

IDMS Download Page, The Society for Information Display (SID), Mar. 31, 2015, pp. 1-3, available online at http://www.sid.org/Publications/ICDM/oldIDMSLicenseamp;Download.aspx.

* cited by examiner

ADJUSTING A HEAD-UP DISPLAY (HUD) BASED ON LIGHT SENSING

CROSS-REFERENCE TO RELATED APPLICATION

This application is related to U.S. patent application Ser. No. 14/556,903, filed on Dec. 1, 2014, which is assigned to the same assignee as the current application, and all of which is incorporated by reference in its entirety as if fully set forth herein.

BACKGROUND

A head-up display (HUD) is an electronic display implemented in a fashion that allows a user to maintain focus in an area that the user was looking at, while still viewing the display. A HUD is implemented on a transparent display, and has conventionally been placed in planes.

In recent times, the HUD is implemented in a vehicle, and in other contexts. Thus, the HUD is become more and more robust and important in electronic control systems and display presentations.

In certain implementations, the HUD may be a stand-alone device, and placed on a surface, such as a dashboard, or hung from a car's roof. In another example, the HUD may be incorporated into a pre-existing window surface, for example a front or side window of a vehicle.

The basic operation of a HUD is that each pixel or portion of displayable space is configured to light up with a specific amount of luminance. The information being conveyed may be communicated by an electronic driver, and attached to various electronic systems implemented along with the HUD. For example, in response to the HUD being implemented in a vehicle, the HUD may be configured to display the speed of the vehicle.

However, because light is employed to convey the electronic information, the viewing experience is affected by the environment in which the HUD is implemented in. For example, if the electronic display is an awkward or inconvenient location, viewing the electronic display may be ultimately frustrated.

Further, the environment around the electronic display may be dynamic and changing. For example, if the electronic display is implemented in an area that interacts with outside or external light providing sources, the HUD's ability to convey information via the lighted elements may be obstructed or modified.

A measure of unit for determining the intensity of light being transmitted or propagated in a specific direction is known as luminance. Various units may be employed to measure luminance, such as a candela per square meter. One of ordinary skill in the art may appreciate that several units or types of measurements may be employed for luminance measurement.

For example, if the HUD is implemented in a vehicle, the electronic display may interact with the outside lighting environment. Thus, several factors may be present with the exterior lighting to affect the display's ability to provide a clear display in an optimal fashion. For example, the exterior lighting may be affected by the cloud cover, the weather, the road (e.g. if the vehicle is in a tunnel), the time of day, or the like.

Thus, an electronic display may be aided greatly by an ability to be cognizant of the exterior lighting conditions. Based on the knowledge of the exterior lighting conditions, the electronic display may adjust the display luminance accordingly.

One such example of a system for adjusting display luminance is shown in FIG. 1. FIG. 1 illustrates an example of a system 100 for adjusting display luminance according to a conventional implementation. Because the system 100 is known in the prior art, a detailed explanation will be omitted. System 100 is referred to as a linear light system. Linear light systems may not work over specific dynamic ranges, such as 6-8 decades. Over these dynamic ranges, an analog-to-digital converter may be inadequate.

FIG. 2 illustrates an example scenario in which light may affect a viewer of a HUD 200. The HUD 200 shown in FIG. 2, is implemented in a vehicle 250. The HUD 200 is gazed upon by a viewer 220. In response to light rays 210 being propagated from an exterior light source (for example, the sun or other light generating sources), the viewing of the HUD 200 via the viewer 220 may be obstructed and modified.

Employing the linear system 100 discussed above may be ineffective in counteracting the effects of the light rays 210 for at least the reasons discussed above. Thus, employing conventional techniques to adjust a HUD 200 may be ineffective and not very robust.

In order to understand how to adjust display luminance, the Silverstein relationship is provided (as explained in several references submitted). The equation described below describes a relationship between the detected DBL and the luminance to be employed in a display.

$$ESL = B_O(DBL)^c$$

the terms being defined as:
ESL=Emitted Symbol Luminance in $cd/m^2$
$B_O$=Luminance Offset Constant
DBL=Various Display Background Luminance in $cd/m^2$
c=Power Constant (slope of the power function in logarithmic coordinates).

With cathode ray tubes (CRT) display technologies, phosphor reflectance does not change as a function of phosphor light emission. A liquid crystal display (LCD) presents a different challenge due to the "on" and "off" state each LCD cell experiences. Thus, variations of the Silverstein relationship may be calculated for LCD displays and HUD based technologies. However, by employing the DBL relationship above, the display visibility may be greatly improved.

However, non-linear forward looking light sensors have not been implemented in existing HUD technologies, and the light sensors that have been employed (integrating the Silverstein methodology discussed above), are linear.

DESCRIPTION OF THE DRAWINGS

The detailed description refers to the following drawings, in which like numerals refer to like items, and in which.

Figure 1:
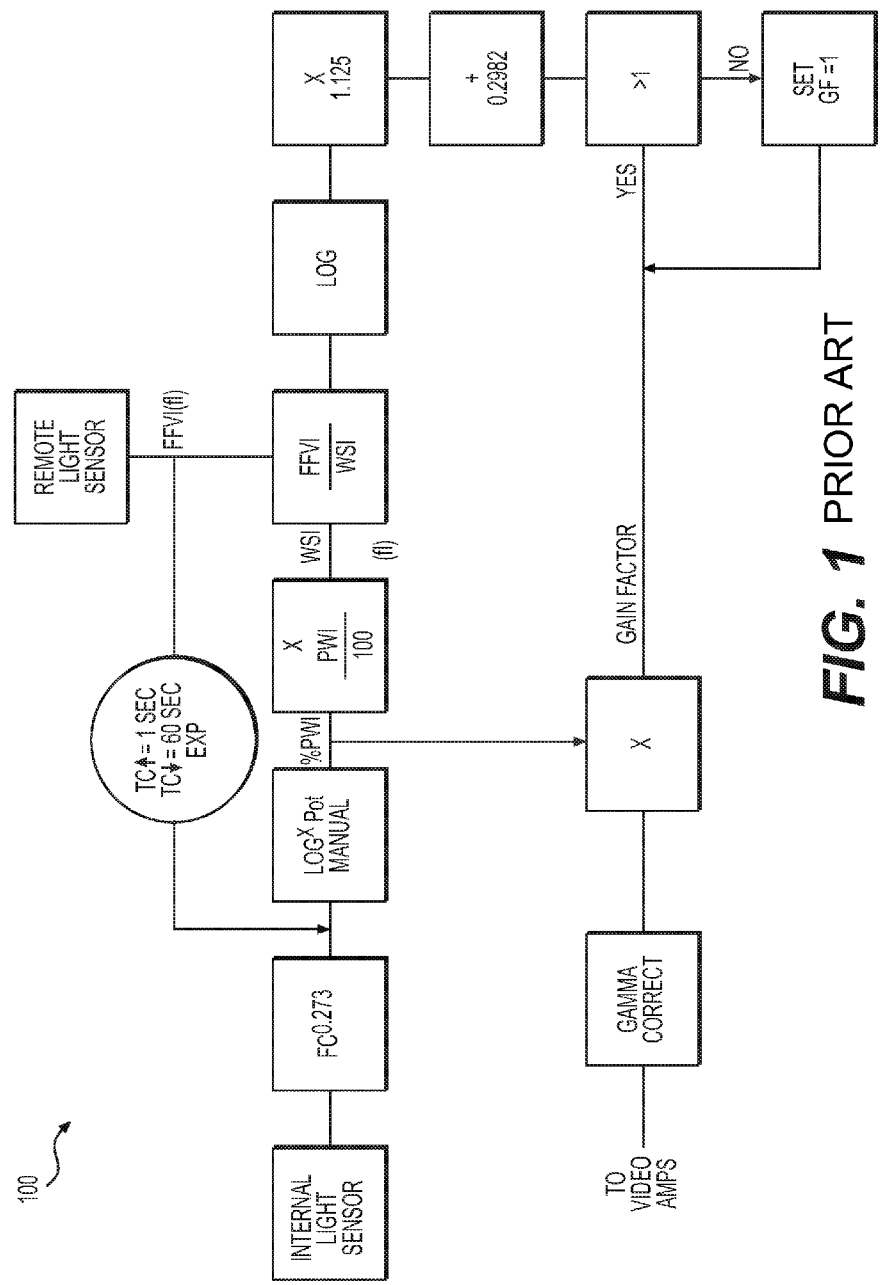
FIG. 1 illustrates an example of a system for adjusting display luminance according to a conventional implementation.
Figure 2:
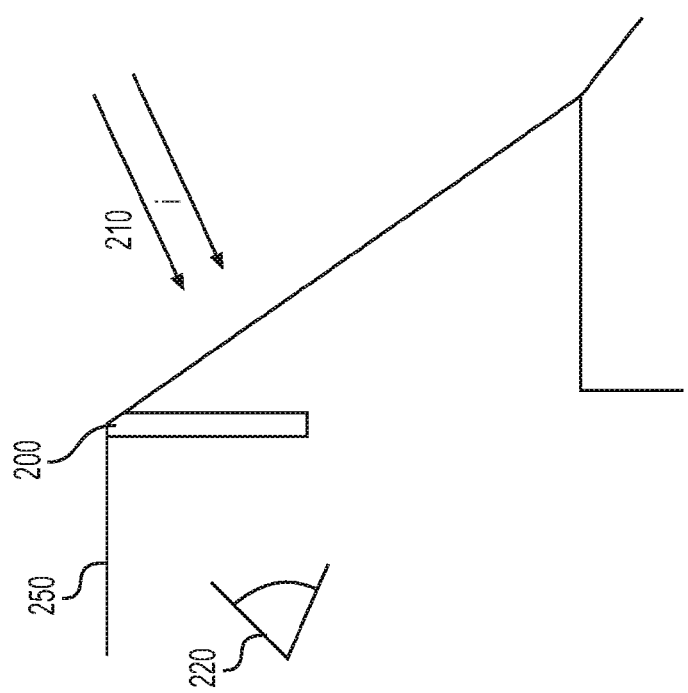
FIG. 2 illustrates an example scenario in which light may affect a viewer of a HUD.

SUMMARY system for adjusting a heads-up display (HUD) is disclosed herein. The system includes a forward looking light sensor receiver to logarithmically receive a first light information from a forward looking light sensor; and an adjuster to adjust a luminance of the HUD based on the first light information. A method or process may be employed in a similar fashion. The adjuster may be implemented by employing a lookup table, or by employing analog values to perform a transformation relied upon for the adjustment.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

HUD systems employ lighting to convey information to a viewer. As explained in the Background section, the lighting is often interfered with due to environmental conditions, such as the sun, external lights, or environmental conditions. In these situations, the viewing experience may be affected by the environmental conditions, and thus, be perturbed.

Various techniques have been disclosed that allow the lighting to be adjusted. However, these techniques are either limited by the ranges or the dynamic abilities they provide.

As illustrated in the Background section and in other techniques, an approximation employing a linear forward looking light sensor has been proposed. This methodology does not work effectively because of the limitation in range associated with linear light sensing. The linear forward looking light sensor services a range that does not adequately cover the amount of detection necessary to successfully implement a technology to adjust the electronic display.

Disclosed herein are methods, systems, and devices for adjusting a HUD based on light sensing. The aspects disclosed herein allow for the employment of logarithmic light sensing on a forward looking light sensor to effectively adjust a HUD system. The various methodologies and components discussed herein facilitate a system rendering or driving an electronic display to adjust light levels in a manner that allows for a dynamic response to environmental concerns with the implementation of a HUD.

For example, if the electronic display is implemented in a vehicle, a forward looking light sensor coupled to a system for adjusting (as disclosed herein), may be employed to dynamically adjust the HUD based on exterior changes to lighting that may affect the viewing of the HUD and the ability to digest information displayed on the HUD.

The aspects disclosed herein employ a vehicle display system for explanatory purposes. However, one of ordinary skill in the art may implement the aspects disclosed herein in other contexts that employ both a forward looking light sensor and a HUD.

The forward looking light sensor in the implementations described below is logarithmic. The employment of a logarithmic light sensor allows for a dynamic range to be represented.

Figure 3:
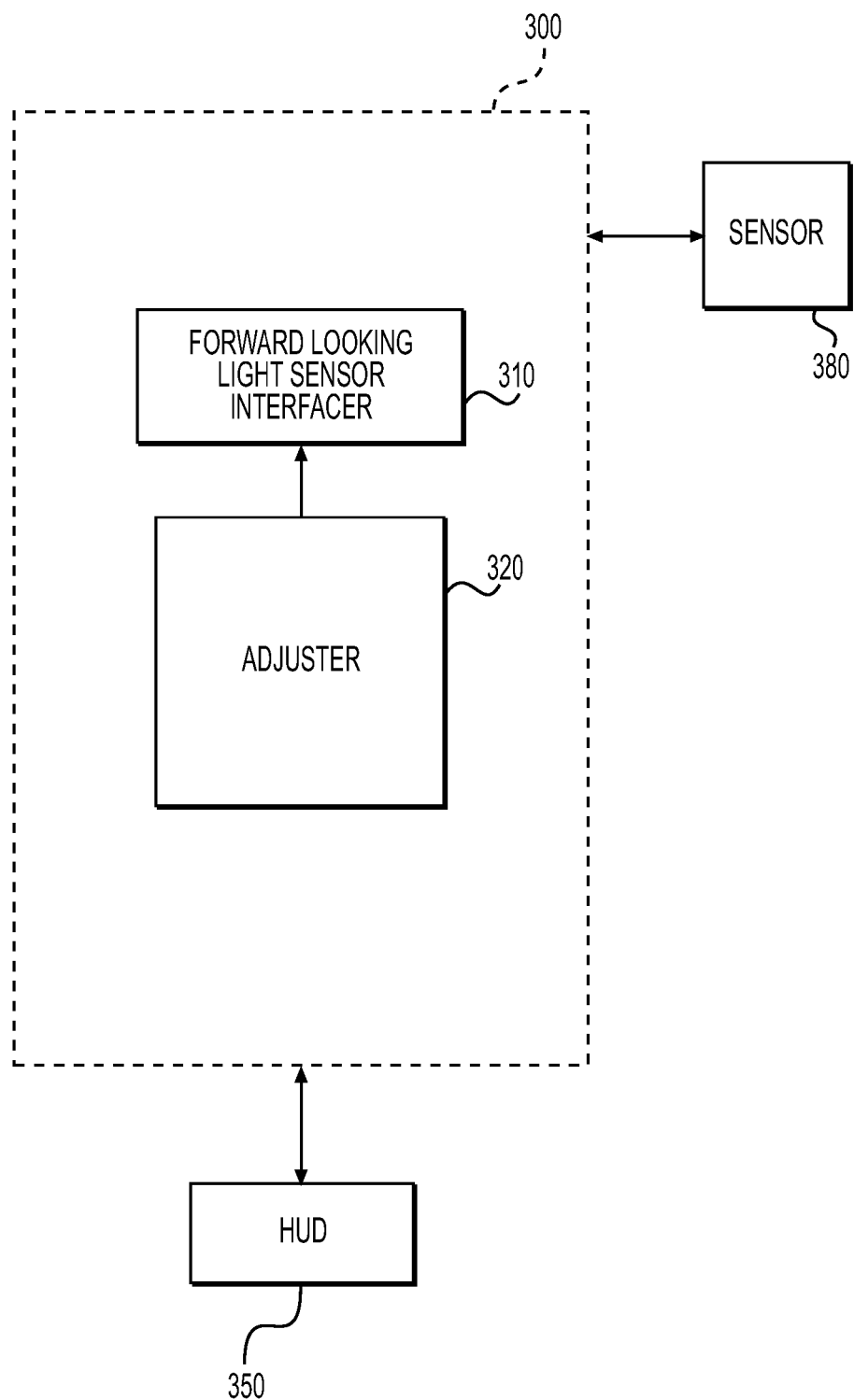
FIG. 3 illustrates an example of implementation of a system for adjusting HUD based on light sensing.

FIG. 3 illustrates an example of implementation of a system 300 for adjusting HUD 350 based on light sensing. Referring to FIG. 3, the system 300 includes a logarithmic forward looking sensor interfacer 310, and an adjuster 320. The adjuster 320 may be configured to operate on a non-transitory computer readable medium, or a processor, as known by one of ordinary skill in the art.

The logarithmic forward looking sensor interfacer 310 is configured to receive data or sensing information from a logarithmic forward looking sensor 380. The luminance is received over a logarithmic scale, therefore allowing for a range of data greater than a linearly received data set. The sensor 380 may be installed in a fashion to replicate an image or area being viewed upon by a person viewing through a forward surface (for example, a windshield in a vehicle). For example, if the HUD 350 is implemented in a vehicle, the sensor 380 may be oriented to view the light coming through a windshield.

The HUD 350 may be any sort of HUD-type display attached to driving circuitry. The HUD 350 renders images and information via lighted elements. The amount of lighting may be configured by an adjustment and according to the aspects disclosed herein.

The sensor 380 is configured to monitor the light associated with the environment each one is situated in. The sensing may occur in real-time, or periodic intervals. The sensing may be configured to be enabled/disabled by user operation, or by an external signal from an electronic system in communication with the HUD 350.

The adjuster 320, based on the information received via interfacer 310, adjusts the lighting associated with the HUD 350. The adjustment may be performed according to the concepts disclosed herein, and will be described in greater detail below.

Figure 4:
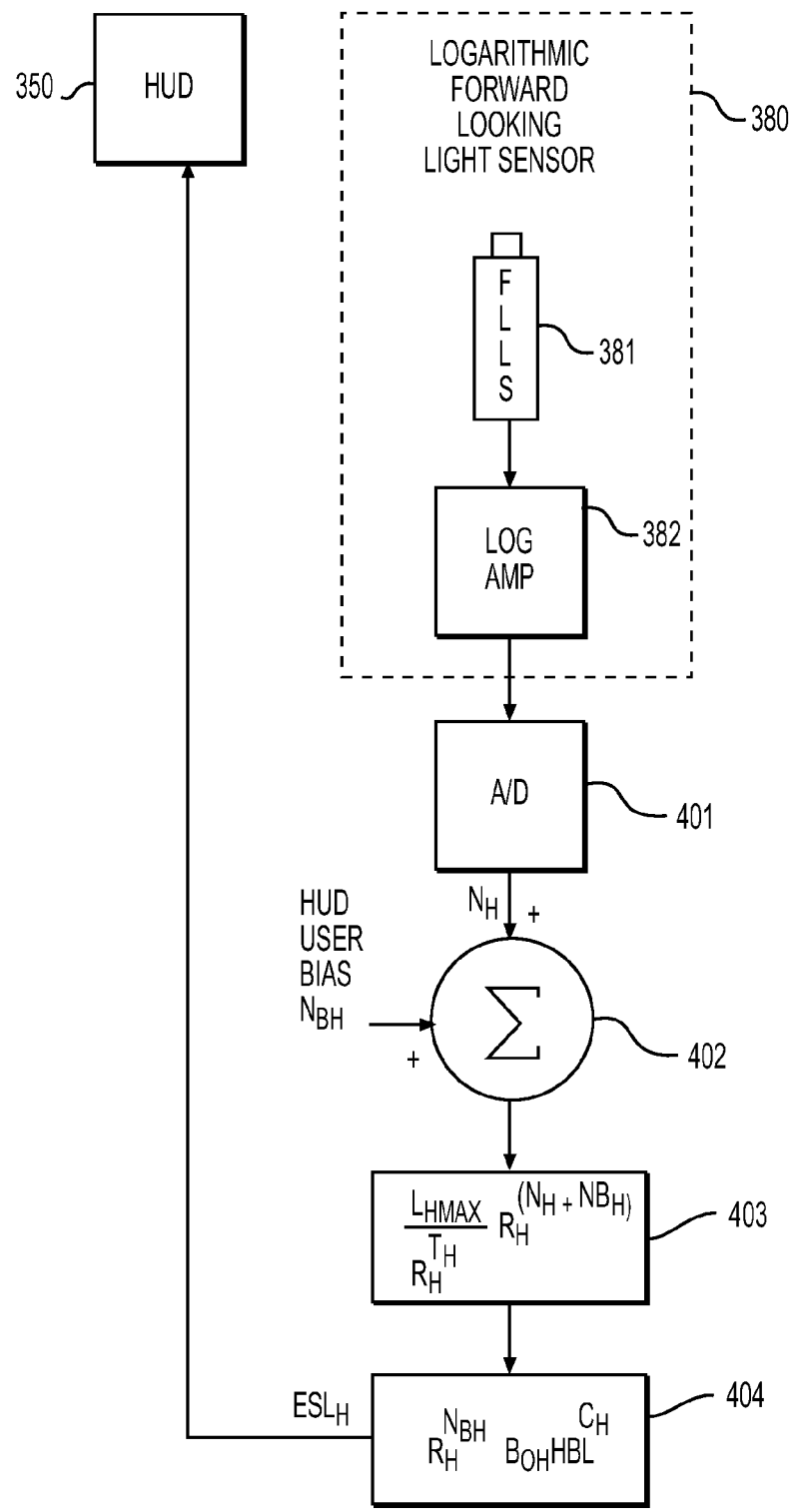
FIG. 4 illustrates an example block level diagram of an implementation of the adjuster as shown with a sensor.

FIG. 4 illustrates an example block level diagram of an implementation of the adjuster 320 as shown with a sensor 380. The elements employed with the block level diagram may be implemented in any sort of circuit or encoded based logic, such as those enumerated below.

Referring to FIG. 4, the sensor 380 includes a forward looking light sensor (FLLS) 381 to perform the forward looking light sensor detection of light, which outputs to a logarithmic amplifier circuit 382. The circuit 382 converts the detected light data to be represented via a logarithmic scale.

The voltage produced by circuit 382 is output to an analog-to-digital converter (A/D) 401. For each data fed through the converter 401, a digital constant is produced. A predetermined lookup table (not shown) may be populated, and correlated to a specific $N_H$ value. The $N_H$ value is employed in the various relationships described below to produce the appropriate adjustment employed to adjust the luminance via the HUD 350.

The transformation performed by converter 401 is described in detail in the cross-referenced application (referenced in the first paragraph of this application). The aspects of converting data from a logarithmic ambient light sensor may be similarly applied to the sensor 380 described herein.

In element 402, the determined $N_H$ value is summed with a HUD user bias $N_{BH}$. The user bias is a constant associated with a user modified preference associated with the operation of the HUD 350. Thus, any sort of adjustment performed via the HUD 350, and by adjuster 320, may compensate for a user bias amount.

The output of element 402 is propagated to the expression shown in element 403. The derivation of the expression in element 403 is discussed in one of the references submitted herein, and thus, a detailed explanation will be omitted.

The output of element 403 (as represented by the R value) is then propagated to element 404, to produce an emitted symbol luminance value for the HUD ($ESL_H$). The R value is a luminance ratio, and once the $N_H$ and $N_{BD}$ value is known, an appropriate R value may be solved for.

Once the $ESL_H$ value is known, the value may be transmitted to the HUD 350, and accordingly employed to modify the HUD based on the detected light.

The various values shown in elements 403 and 404 are constants that are based on the type of HUD 350 and sensor 380 employed. For example, the values below may be set (please note these values are purely exemplary):

HUD $L_{Max}$=10,000 cd/m2

HUD $L_{Min}$=80 cd/m2

HUD T=10

HUD $C_H$=0.273

Figure 5:
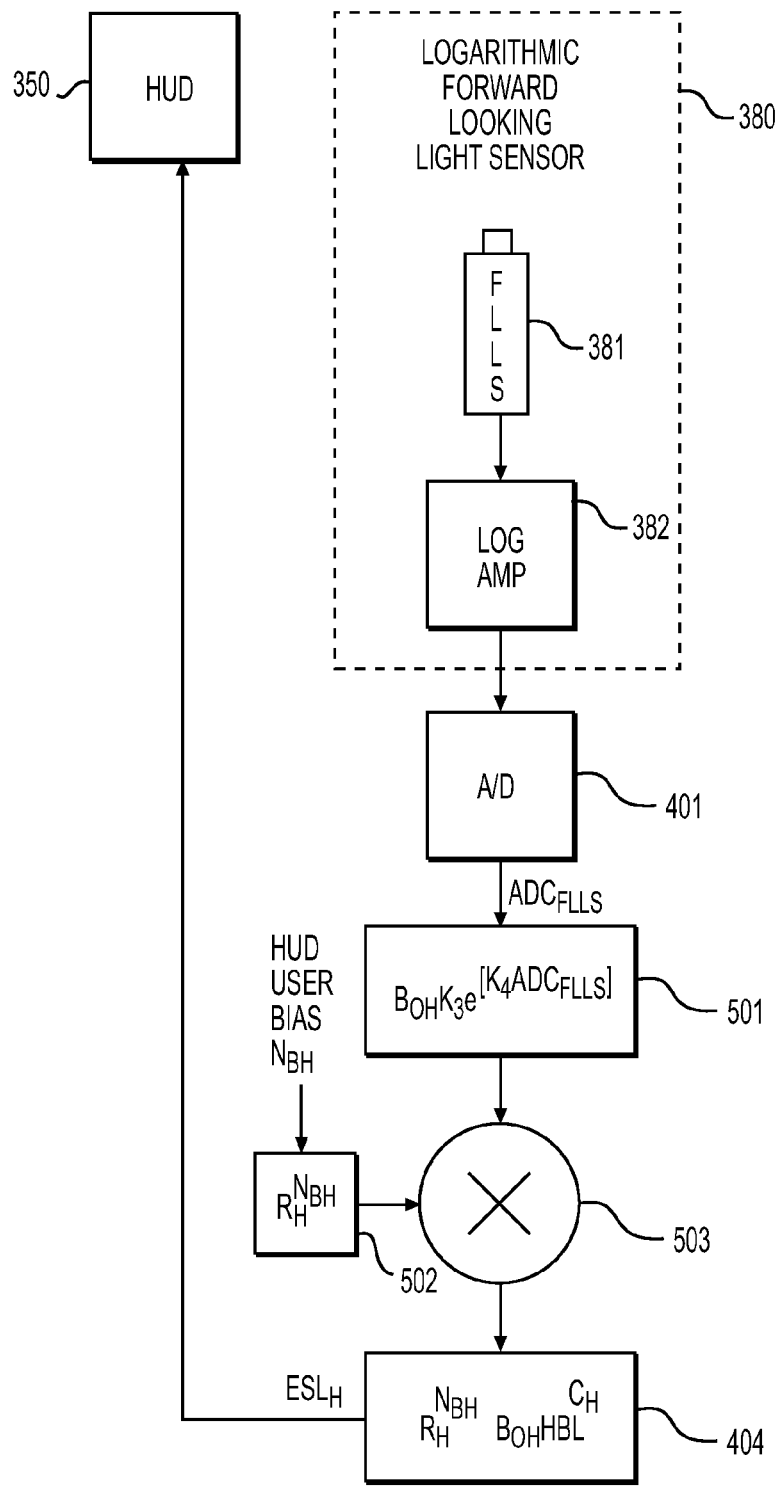
FIG. 5 illustrates another example implementation of an adjuster.

FIG. 5 illustrates another example implementation of adjuster 320. The implementation in FIG. 5 is similar to the one shown in FIG. 4; however, various of the elements are changed, as shown in FIG. 5 and in the series of mathematical expressions explained below. The example shown in FIG. 5 employs mathematical calculations, and obviates the need for any lookup tables, such as a lookup table employed to translate the output of element 401.

As shown in FIG. 5, a value produced by element 401 is propagated into element 501 (which shows an expression). Element 501 is similar to the transformation performed in element 810 of the cross-referenced application, with the constants being associated with the HUD 350 instead of an electronic display.

In element 503, the output of element 501 is multiplied by a constant value obtained by cross-referencing a user bias amount associated with HUD (element 502). This produces element 404, which is employed similarly as described in FIG. 4 to adjust the HUD 350.

Figure 6:
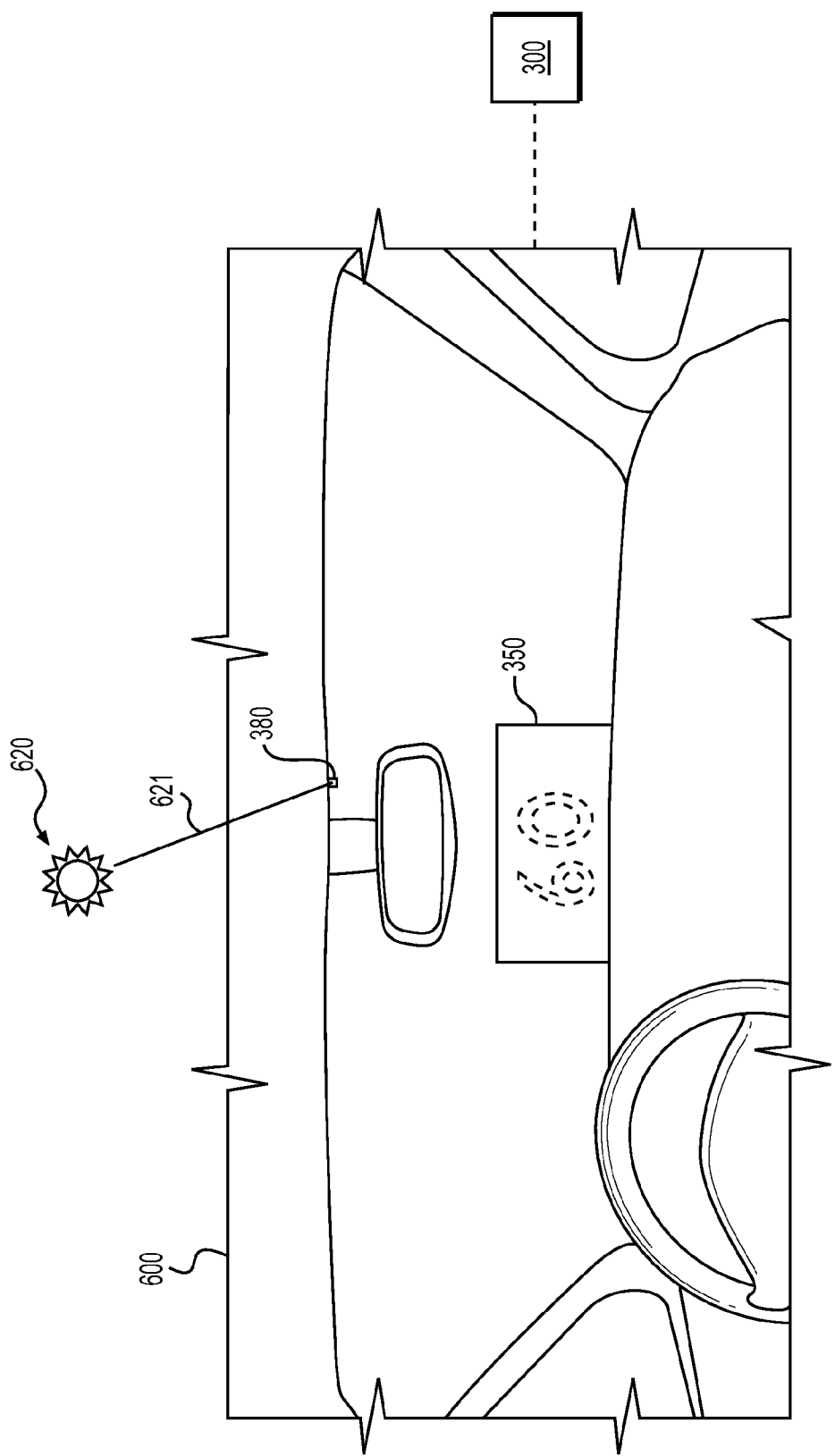
FIG. 6 illustrates an example of a vehicle 600 implementing a system 300 as described herein.

FIG. 6 illustrates an example of a vehicle 600 implementing a system 300 as described herein. The system 300 may employ any of the adjuster 320 embodiments disclosed herein.

Specifically, a view of the vehicle from a driver/passenger looking outside of a front window is depicted. The other elements of the vehicle are not shown or described for exemplary purposes. The vehicle includes a HUD 350, which may be any HUD 350 known to one of ordinary skill in the art. Also situated in the vehicle is a light sensor 380, which facilitates the light sensing that is employed by system 300.

As shown in FIG. 6, a light source 620 is shown. The light source 620 may emanate from outside of the vehicle, and be sourced from either a street light or a naturally occurring phenomena, such as the sun. The light source 620 produces a light ray 621. Light ray 621 may be representative of a light that a driver/passenger sees while looking outside the windshield 610.

The system 300 employs the techniques described up above to sense the light ray 621, and subsequently adjusts HUD 350. The HUD 350 employs a logarithmic light sensing technology to adjust the luminance, therefore, employing a technology not implemented in known or existing versions of HUD implementations.

FIG. 6 illustrates an example where system 300 is implemented in a vehicle. However, one of ordinary skill in the art may implement system 300 in any sort of environment where a HUD 350 is situated in.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for adjusting a heads-up display (HUD), comprising:
   a forward looking light sensor receiver to logarithmically receive a first light information from a forward looking light sensor; and
   an adjuster to adjust a luminance of the HUD based on the first light information, and
   wherein the first light information undergoes an analog-to-digital transformation to produce a digital version of the first light transformation,
   the digital version of the first light information is transformed independent a linear transformation of data, with the range of adjustment being based on a logarithmic range, to produce a transformed output,
   and after the digital version of the first light information is transformed, the transformed output is multiplied by cross-referencing a user bias amount associated with the HUD, with the multiplied output being employed by the adjuster to adjust the luminance.

2. The system according to claim 1, wherein the first information, after undergoing the A/D conversion, is combined with a display user bias to produce an output.

3. The system according to claim 2, wherein the first information, after undergoing the A/D conversion, is cross-referenced with a lookup table to retrieve a constant.

4. The system according to claim 2, wherein the output is employed to perform the adjustment of the HUD via a transformation.

5. The system according to claim 3, wherein the constant is employed to perform the adjustment of the HUD via a transformation.

6. The system according to claim 4, wherein the transformation is based on a Silverstein relationship.

7. The system according to claim 5, wherein the transformation is based on a Silverstein relationship.

* * * * *